United States Patent [19]
Kronich

[11] Patent Number: 4,757,885
[45] Date of Patent: Jul. 19, 1988

[54] ENGINE CONTROL WITH SELF-ENERGIZING FLYWHEEL BRAKE

[75] Inventor: Peter G. Kronich, Sheboygan, Wis.

[73] Assignee: Tecumseh Products Company, Tecumseh, Mich.

[21] Appl. No.: 77,010

[22] Filed: Jul. 13, 1987

Related U.S. Application Data

[63] Continuation of Ser. No. 321,769, Nov. 16, 1981, abandoned.

[51] Int. Cl.⁴ ............................................. B60K 41/20
[52] U.S. Cl. .................... 192/1.4; 192/129 A; 192/1.52; 188/166; 56/10.5; 56/11.3; 180/272; 200/61.87
[58] Field of Search ............... 192/1, 2, 17 R, 18 R, 192/3 S, 0.08 Z, 129 R, 129 A, 144; 56/10.5, 10.8, 11.3, 10.2, DIG. 15; 188/166; 74/850, 471 R; 200/61.85, 61.87, 157; 180/272

[56] References Cited

U.S. PATENT DOCUMENTS

| | | | |
|---|---|---|---|
| 1,033,519 | 7/1912 | Banzhof | 192/2 |
| 1,847,645 | 3/1932 | Friedman | 192/17 R |
| 1,951,189 | 3/1934 | Fogarty, Jr. | 192/1 |
| 2,211,279 | 8/1940 | Letner | 192/144 |
| 2,287,199 | 6/1942 | Schick | 192/3 R |
| 2,399,542 | 4/1946 | Collins | 74/471 R |
| 2,480,343 | 8/1949 | Sully | 188/166 |
| 3,026,665 | 3/1962 | Hoff | 56/11.3 |
| 3,182,917 | 5/1965 | Tamny et al. | 241/36 |
| 3,224,474 | 12/1965 | Bloom | 30/374 |
| 3,228,177 | 1/1966 | Coates | 56/10.5 |
| 3,290,871 | 12/1966 | Haas | 56/10.5 |
| 3,324,842 | 6/1967 | Haas | 123/185 BA |
| 3,845,847 | 11/1974 | Camp | 192/3 S |
| 3,849,620 | 11/1974 | Melisz | 200/157 |
| 3,957,131 | 5/1976 | Perkins | 180/272 |
| 4,006,528 | 2/1977 | Katsuya | 192/17 R |
| 4,035,994 | 7/1977 | Hoff | 56/11.3 |
| 4,090,345 | 5/1978 | Harkness | 56/10.5 |
| 4,141,439 | 2/1979 | Lunde et al. | 192/18 R |
| 4,205,737 | 6/1980 | Harkness et al. | 192/17 R |
| 4,221,108 | 9/1980 | Owens | 56/11.3 |
| 4,326,368 | 4/1982 | Hoff | 56/11.3 |
| 4,333,303 | 6/1982 | Plamper | 56/11.3 |
| 4,394,893 | 7/1983 | Kronich et al. | 192/1 |
| 4,419,857 | 12/1983 | Smith | 56/10.8 |

FOREIGN PATENT DOCUMENTS

| | | | |
|---|---|---|---|
| 128550 | 11/1928 | Fed. Rep. of Germany | 74/471 R |
| 48-44505 | 12/1973 | Japan | |
| 51-52100 | 12/1976 | Japan | |
| 134930 | 10/1977 | Japan | |
| 118535 | 7/1984 | Japan | 192/3 S |

Primary Examiner—Leslie A. Braun
Assistant Examiner—David A. Testardi
Attorney, Agent, or Firm—Jeffers, Hoffman & Niewyk

[57] ABSTRACT

A system for quickly stopping the internal combustion engine of a powered implement having a deadman control normally biased toward a first position and actuable by the implement operator to a second position for normal implement operation and optionally to a third position for actuating an engine starting mechanism. The engine has a flywheel coupled thereto for rotation with the engine crankshaft and that flywheel is provided with an annular friction surface of generally cylindrical configuration disposed coaxial with the axis of rotation of the flywheel. A braking member having a second friction surface is normally biased into engagement with the flywheel friction surface and coupled to a deadman control so that the two friction surfaces will be disengaged upon movement of the deadman control to a second or operational position by the implement operator. The system includes an arrangement for disabling the engine ignition system upon release of the deadman control and prior to engagement of the friction surfaces. The brake is self-actuating in the sense that once the friction surfaces are engaged, continued flywheel rotation forces or wedges the two braking surfaces together with substantially greater force than the force causing initial contact between those two surfaces.

18 Claims, 3 Drawing Sheets

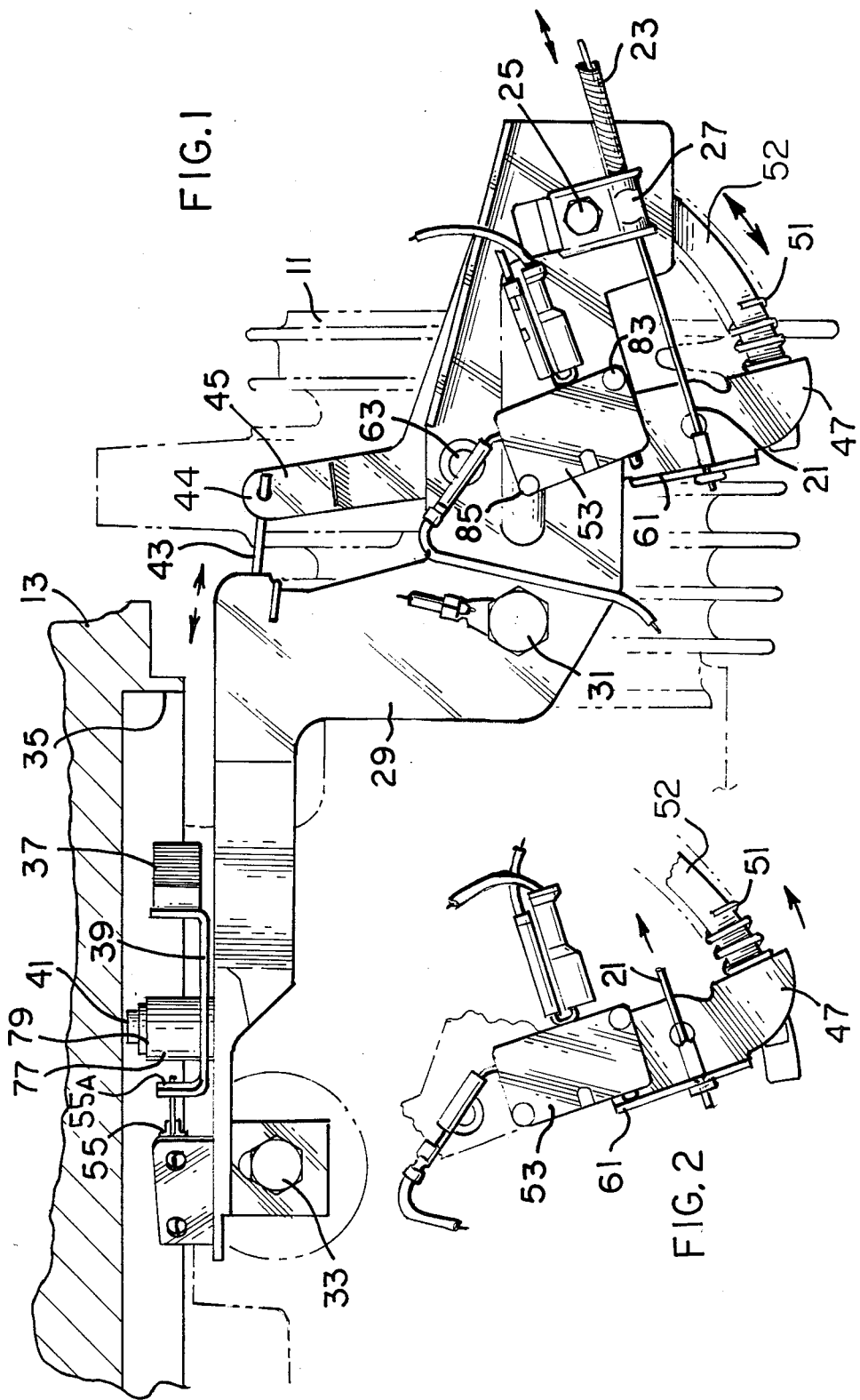

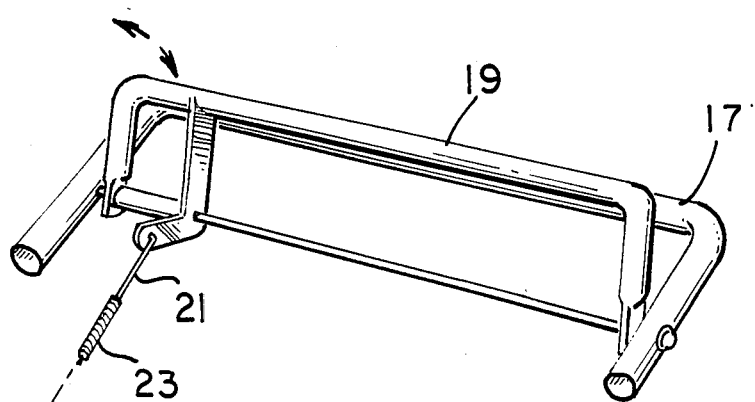
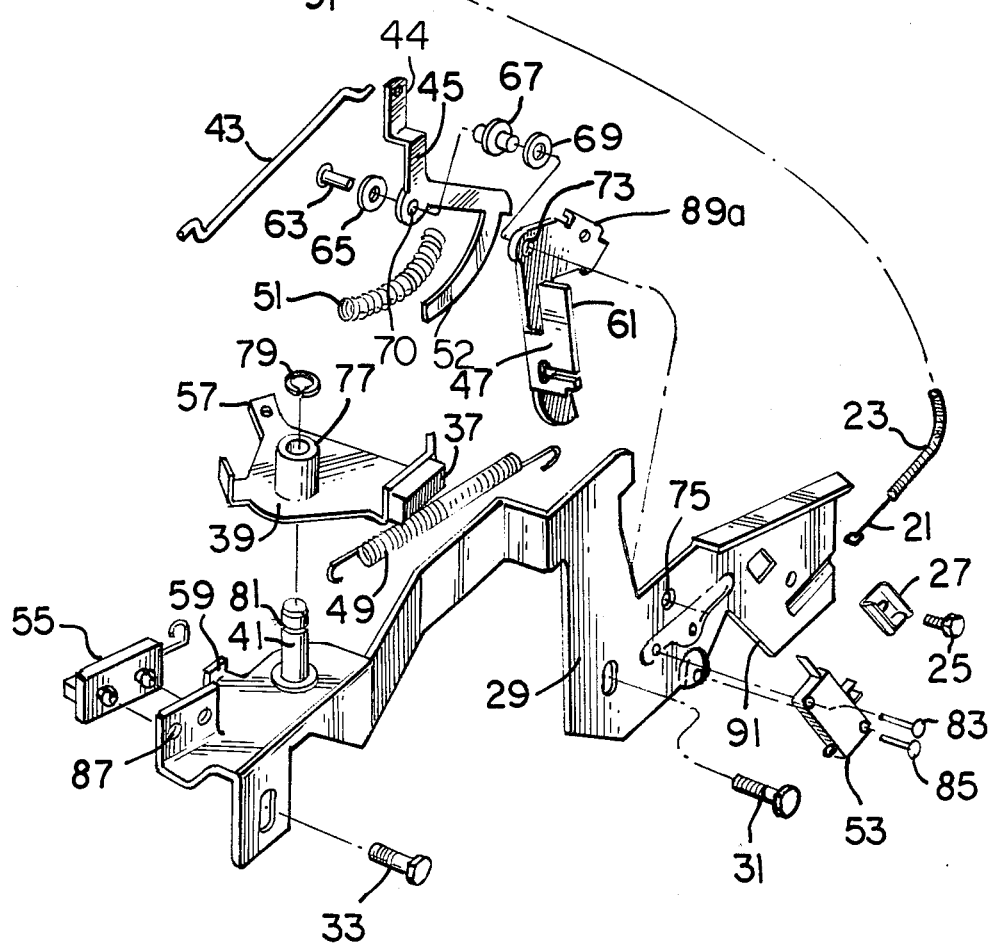
FIG. 3

# ENGINE CONTROL WITH SELF-ENERGIZING FLYWHEEL BRAKE

This is a continuation of application Ser. No. 321,769, filed Nov. 16, 1987, now abandoned.

BACKGROUND OF THE INVENTION

The present invention relates generally to safety devices for internal combustion engine powered implements and more particularly to such safety devices which function to promptly stop the engine in the event that the implement operator moves from his normal operating position.

The need for safety devices for power driven implements to reduce the probability of injury to the operator or others has long been recognized and a wide variety of such safety devices are known. The provision of a protective shield or shroud around dangerous moving parts is commonplace as is the automatic disabling of a dangerous instrumentality when its normal operating mode is interrupted.

A typical illustration of the disabling type safety device is the so-called deadman lever. Such levers are frequently employed on the handle of lawnmowers, garden tillers, snowblowers and the like, and require the operator to be gripping the handle and depressing the lever against a normal spring bias to render the device operational. In the event that the operator releases his grip on the handle, the deadman lever moves typically away from the handle to a position to disable the device. One such known deadman lever disables the ignition circuit on an internal combustion engine rotary lawnmower. Another known deadman lever arrangement is connected to an idler wheel or pulley in the V-belt drive arrangement for a garden tiller with that pulley spring biased toward a position away from the V-belt. Under these conditions the V-belt drive is interrupted since the belt is larger than required to connect the engine to the tiller moving parts and only when the deadman lever is depressed forcing the pulley into engagement with the V-belt and removing slack from the V-belt drive is the tiller operational.

Another known application of a deadman lever to a power driven implement is the interposition of a clutch brake arrangement between the power source such as an internal combustion engine and the dangerous instrumentality such as the rotating blade of a rotary lawnmower or snowthrower. The deadman lever when depressed actuates the clutch to couple the power source to the rotating blade while when the lever is released the clutch is disengaged and a brake actuated to stop the rotary blade.

It would be highly desirable to retain the advantages of the deadman lever type safety device without the necessity of providing a clutch drive between the power source and the dangerous instrumentality and further highly desirable to reduce as far as possible the time interval between the release of the deadman lever and the stopping of the dangerous instrumentality. It would also be highly desirable to provide a safety device wherein the operator must return to his normal operating position before the instrumentality may be reenergized. These desires, as well as others, have been achieved in copending United States Patent Application Ser. No. 205,010 filed Nov. 7, 1980, now U.S. Pat. No. 4,394,893, the entire disclosure of which is specifically incorporated herein by reference.

Briefly in the aforementioned copending application, flywheel braking is achieved upon the release of a deadman control by pivoting a braking member into engagement with a lower annular surface of the flywheel or by moving the braking member generally parallel to the flywheel lower annular surface and into engagement therewith by a ramp arrangement forcing the braking member toward the flywheel surface. In either case, the force between the braking member and the flywheel surface is the force determined by the spring or other arrangement forcing those two surfaces together, and it is this same force which must be overcome by the operator when actuating the deadman lever to disengage the brake, and it would be highly desirable to provide the advantages and safety features of the aforementioned copending application while reducing the force required on the deadman control to maintain the brake arrangement disengaged.

SUMMARY OF THE INVENTION

Among the several objects of the present invention may be noted the provision of an arrangement responsive to a deadman control which when that control is released, operates to rapidly stop engine motion, the stopping time being generally less than three seconds and frequently on the order of one and one-half seconds; the provision of a safety device which retains the objects and advantages of the aforementioned copending application while improving substantially certain features thereof; the provision of a self-actuating braking force which is not a function of the spring tension initially actuating that braking arrangement; the provision of a self-actuating brake wherein wear of the braking surfaces within limits increases the effective braking force; the provision of a safety device in the form of a brake on an inner rim of an engine flywheel thereby conserving space in the engine environment; the provision of a safety arrangement which allows an operator to distinguish the function of a control lever by the substantially different actuating forces required on that control lever; and the provision of a safety arrangement to automatically protect an implement user from some of the inherent dangers of that implement. One of the advantages of the present invention is that in accomplishing the foregoing objects, a control arrangement with but a single cable and a single operator control provide start, run, ignition kill, and braking functions.

In general, a safety device for an internal combustion engine includes a flywheel coupled to the engine crankshaft for rotation therewith, a braking member having a friction surface normally biased into engagement with a cylindrical inner friction surface of that flywheel and a coupling arrangement between a deadman control and the braking member for retracting the friction surface out of engagement with the flywheel braking surface upon actuation of the deadman control by an implement operator. If the engine has an electric start feature that starting mechanism may be enabled upon movement against an enhanced biasing of the deadman control beyond the running position. This may be accomplished by an intermediate control lever acting on a bowden cable coupling the deadman control to the braking mechanism or simply by additional movement of the deadman control. Upon initial engagement between the flywheel braking surface and the friction surface, continued flywheel rotation induces additional movement of the friction surface, wedging that surface against the flywheel and increasing the effective force urging the two friction surfaces together.

Also in general and in one form of the invention, a safety device for an implement having a rotatable flywheel with an inner cylindrical braking surface has a braking lever with a friction surface near one end thereof pivotably located within the cylindrical braking surface of the flywheel for pivotal movement about an axis near the other end thereof for selective engagement of the braking and friction surfaces to halt rotation of the flywheel. Continued flywheel rotation again increases the effective force between the braking and friction surfaces to more rapidly halt flywheel rotation.

Still further in general and in one form of the invention, a method of starting an electric start internal combustion engine powered implement includes the initial movement of a control against a first biasing force to release an implement brake, further movement of the control enabling the engine ignition system, and still further movement of the control, against a now increased biasing force, enabling the engine starting mechanism. Releasing the control from the increased biasing force allows the implement to assume a running mode while total release of the control first disables the engine ignition system and then applies a brake, stopping the engine.

BRIEF DESCRIPTION OF THE DRAWING

FIG. 1 is a side elevation view of a portion of a vertical crankshaft internal combustion engine illustrating the safety device of the present invention in one form;

FIG. 2 is an enlarged view of the starter switch and starter switch actuating mechanism of FIG. 1;

FIG. 3 is an exploded perspective view of a fragment of the engine powered implement, a deadman control, and braking arrangement;

Corresponding parts are identified by corresponding reference characters throughout the several views of the drawing.

Figure 4:
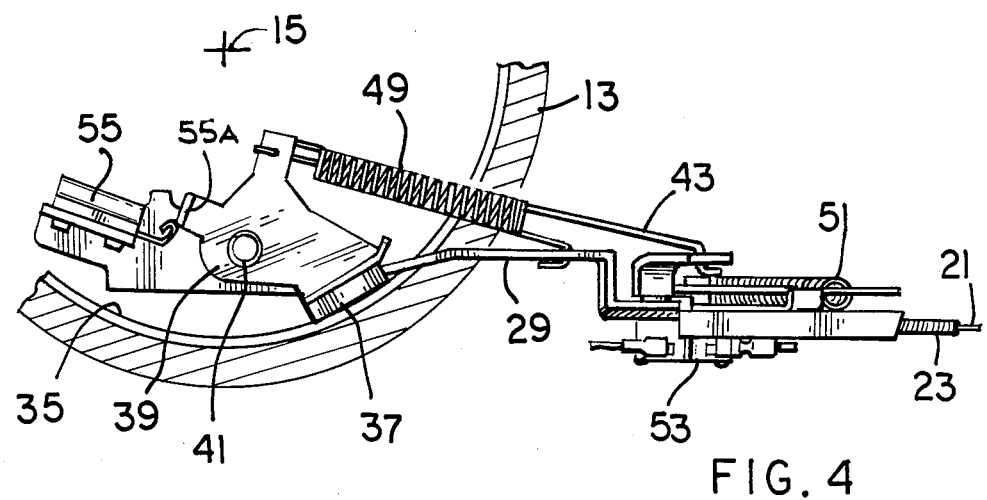
FIG. 4 is a view from the top of FIG. 1 illustrating the braking mechanism in its brake applied position.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Referring first to the drawing generally, an internal combustion engine having a cylinder 11 and flywheel 13 rotatable about the center line 15 of the engine crankshaft powers an implement such as a lawnmower, snowthrower, garden tiller, or the like, with the handle 17 of that implement illustrated. A deadman control lever 19 is gripped by the implement operator, pulling the deadman control lever 19 toward the handle 17 and extracting cable 21 from a sheath 23 of a conventional bowden cable. The other end of sheath 23 is clamped by bolt 25 and bracket 27 of a brake actuating frame 29. Frame 29 is mounted to the engine such as by mounting bolts 31 and 33.

An internal annular rim 35 of flywheel 13 which is generally cylindrical in configuration is selectively engaged by a brake pad 37, carried by a pivotable brake arm or control lever 39 which pivots about the axis of pivot pin 41. A rigid link 43 connects the brake arm 39 to tab 44 of a bifurcated control lever 45, 47 with portion 47 being connected to the control cable 21. Spring 51 on arcuate leg 52 provides the increased spring biasing against which the deadman lever 19 must be pulled in order to engage an electrical starting switch 53, while spring 49 which is of comparatively lighter force is the spring which causes initial engagement between the brake pad 37 and annular rim 35 and is the spring force against which the deadman lever 19 must be maintained during normal implement operation.

Figure 5:
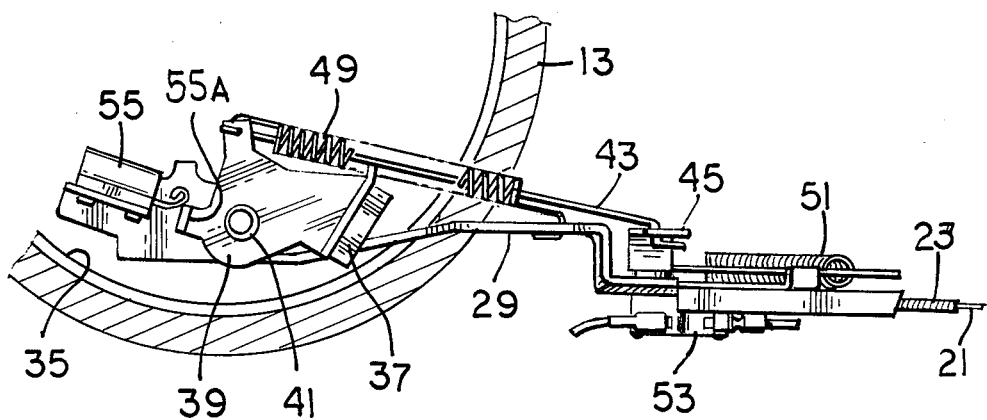
FIG. 5 is a view similar to FIG. 4 but illustrating the brake arrangement in its ignition kill position.
Figure 6:
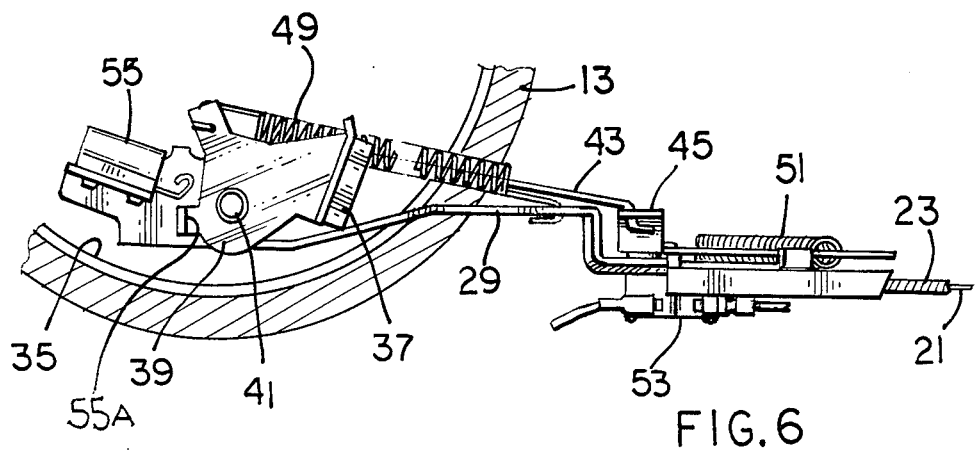
FIG. 6 is a view similar to FIGS. 4 and 5 but illustrating the brake mechanism in its run position.

As the operator pulls the deadman lever 19 toward the handle 17, cable 21 moves the lever portions 45 and 47 together, pushing the link 43 against the tension of spring 49 so as to rotate the lever 39 about pivot pin 41 in the counterclockwise direction as viewed in FIGS. 4 to 6, separating brake pad 37 from the annular surface 35. Continued movement of the deadman lever 19 toward handle 17 then disengages tab 55a from the ignition killing switch 55 thereby deactuating it. Still further movement of the deadman control 19 toward handle 17 causes engagement between the tab 59 of frame 29 and surface 57 of lever 39 so that no further relative rotation of the lever 39 occurs. Additional movement of the deadman control then causes relative rotation between the two lever portions 45 and 47 compressing spring 51 until the tab 61 of lever 47 engages and actuates the starting switch 53.

In FIG. 3, it will be noted that the lever portions 45 and 47 are pivotably joined by pin 63 and various washers and bushings 65, 67 and 69 with pin 63 passing through the apertures 71, 73 and 75. Lever arm 39 is fastened to the frame 29 by passing its apertured sleeve 77 over the pivot pin 41 and thereafter engaging snap ring 79 in slot 81. The starting switch 53 is fastened to frame 29 by a pair of screws 83 and 85 while the ignition grounding switch 55 may be crimped in holes such as 87 in the frame or bracket 29. Movement of the deadman control 19 against the spring biasing forces is ultimately limited by the engagement of surface 89 of lever portion 47 with surface 91 of the frame 29.

Referring now to FIG. 4, and recalling that the friction surface 37 supporting lever 39 is pivoted at 41, the rotation of flywheel 31 is in the clockwise direction, as viewed, and upon initial contact between the friction surface 37 and friction surface 35, continued flywheel rotation in the clockwise direction tends to rotate the lever 39 clockwise about its axis or pivot pin 41, therefore wedging the two friction surfaces tightly together, increasing the normal force therebetween and rapidly halting flywheel rotation. The effective angle between a tangent to the flywheel and the line joining the center of the pivot pin 41 with the point of engagement between the two friction surfaces is preferably on the order of 45 degrees and cannot, of course, exceed 90 degrees.

In essence then, the brake mechanism uses the internal rim 35 of the engine flywheel for a braking surface, using a pivoting brake arm 39 on a bracket 29 which rotates to engage the braking surface 37 with the rim of the flywheel. Flywheel rotation causes a wedging action which makes the braking force dependent on the speed of engagement and the coefficient of friction of the brake pad 37 relative to the coefficient of friction of the flywheel 13. Typically flywheel 13 is cast of an aluminum alloy. The braking force is then not dependent on the force applied by spring 49 which functions to cause initial engagement between the two braking surfaces but rather is dependent on the wedging action caused by flywheel rotation. As the pad 37 wears, the braking action will increase as the wedging angle changes to create a more positive wedging action. This wear feature results in a more constant stopping time with wear. Additionally, with a greater engine speed, the braking force will increase due to the higher peripheral velocity on initial contact between the braking surface, again resulting in a more constant stopping time. The braking time is, of course, variable within limits, by varying the angle of engagement between the arm 39 and the flywheel.

With a single control cable and single control lever 19, as illustrated, the brake and ignition kill functions are controlled by the tension spring 49 while the override or starter switch control cable tension is determined by the spring 51. Spring 51 being a stronger spring than spring 49, the upper and lower lever portions 45 and 47 move together until the brake is completely disengaged and ignition grounding switch 55 open, and then when the tab 59 engages arm 39, a substantially stronger pull by the operator against the force of spring 51 is required to continue counterclockwise movement of the arm 47, as viewed in FIGS. 1 and 2, until the tab 61 actuates the starting switch 53. A two lever variation of this concept is possible so that movement of the deadman lever 19 even to its extreme position only results in the release of the braking function and opening of the ignition kill switch. A second lever is positioned along the bowden cable 21 so that the cable is supported at two separated points such as 89 and 91 in FIG. 3, and the separate control lever applies a force along arrow 93 generally perpendicular to the direction of elongation of the bowden cable, displacing the segment between the two support arrows 89 and 91, to effectively decrease the overall length of that cable and further rotate the lever portion 47 so as to actuate starter switch 53.

In summary then, a scheme for starting an electric start internal cmbustion engine powered implement has been disclosed in conjunction with a unique self-actuating braking system wherein the operator may initially move a control against a first biasing force to release the implement brake and then further move the control to enable the engine ignition system. Still further movement of the control against an increased biasing force allows the operator to engage an engine start-up mechanism and thereafter release the control only against the increased biasing force to a running position. Complete release of the control causes the engine ignition system to first be disabled and thereafter reapplies the brake so as to stop the engine within a very short time interval. Cable tensions on the order of four pounds and eight pounds, respectively, have been found suitable.

From the foregoing it is now apparent that a novel safety device for an internal combustion engine powered implement has been disclosed meeting the objects and advantageous features set out hereinbefore as well as others and that modifications as to the precise configurations, shapes and details may be made by those having ordinary skill in the art without departing from the spirit of the invention or the scope thereof as set out by the claims which follow.

What is claimed is:

1. A safety device for an internal combustion engine powered implement having a crankshaft, an ignition system and a deadman control normally biased toward a first position and actuable by an implement operator to a second position comprising:

a flywheel coupled to the engine crankshaft for rotation therewith, said flywheel having an inner cylindrical surface concentric with said crankshaft;

a self-energizing, pivotally mounted braking member having a friction surface, spring means connected to said braking member for normally biasing said braking member friction surface radially outward into engagement with the inner cylindrical surface of the flywheel; and means coupled to the deadman control for positively radially retracting the braking member to retract the frictional surface out of engagement with the flywheel inner surface against the force of the spring bias means upon movement of the deadman control from the first position toward the second position.

2. The safety device of claim 1 wherein the implement includes an operator actuable engine starting mechanism actuated by operator movement of the deadman control beyond the second position.

3. The safety device of claim 1 wherein the braking member comprises a friction surface supporting lever pivotably attached near one end thereof to the engine.

4. The safety device of claim 3 including a pivot means pivotably supporting the friction surface supporting lever one end whereby upon initial contact between the friction surfaces continued flywheel rotation induces radially outward pivotal movement of the friction surface supporting lever and a corresponding increase in the normal force urging the friction surfaces together.

5. The method of starting an electric start internal combustion engine powered implement comprising the steps of:

initially moving a control against a biasing force to release an implement brake;

further moving the control to activate the engine ignition system;

still further moving the control against a stepped increased biasing force;

continuing to move the control against the stepped increased biasing force before contacting a starting switch mechanism with the control and then contacting said starting switch mechanism with the control to activate an engine starter; and releasing the control from the stepped increased biasing force to a running position.

6. The method of claim 5 wherein the control includes a bowden cable and the step of still further moving includes applying a force generally perpendicular to the direction of elongation of the bowden cable displacing a segment of the cable.

7. A safety device for an internal combustion engine powered implement having a crankshaft, an ignition system and a deadman control normally biased toward a first position and actuable by an implement operator to a second position comprising:

a flywheel coupled to the engine crankshaft for rotation therewith, said flywheel having an inner cylindrical surface concentric with said crankshaft;

a self-energizing, pivotally mounted braking member having a friction surface, spring means connected to said braking member for normally biasing said braking member friction surface radially outward into engagement with the inner cylindrical surface of the flywheel;

means coupling the braking member to the deadman control for radially retracting the braking member to retract the frictional surface out of engagement with the flywheel inner surface against the force of the spring bias means upon movement of the deadman control from the first position toward the second position; and electrical switch means coupled to said deadman control for disabling the engine ignition system when the deadman control is moved in a direction to enable the braking member to pivot toward the flywheel engaging position.

8. The safety device of claim 7 wherein the electrical switch means is coupled to the deadman control through said braking member and is actuated by the movement of the braking member toward the flywheel engaging position.

9. The safety device of claim 7 wherein said spring means also biases said deadman control toward the first position.

10. The safety device of claim 9 wherein said spring means comprises a coil spring means in engagement with said braking member and biasing said braking member against said flywheel, the braking member comprising a friction surface supporting lever pivotally attached near one end of said lever to the engine.

11. The safety device of claim 7 further comprising a second electrical switch means in an engine electric start circuit, the deadman control being actuable by an implement operator to yet a third position and including means for actuating said second switch means when said deadman control is in the third position for enabling the second electrical switch means for starting the engine.

12. A safety device for an internal combustion engine power implement having a crankshaft, an ignition system and a deadman control normally biased toward a first position and actuable by an implement operator to a second position comprising:

a flywheel coupled to and concentric with the engine crankshaft for rotation therewith, said flywheel having a cylindrical inner surface, a self-energizing braking member having a friction surface, first spring bias means for normally biasing said braking member friction surface into engagement with the inner surface of said flywheel, means coupling the braking member to the deadman control for retracting the frictional surface out of engagement with the flywheel surface against the force of the first spring bias means upon movement of the deadman control from the first position toward the second position, first electrical switch means coupled to said deadman control for disabling the engine ignition system when the deadman control is moved in a direction to enable the braking member to move toward the flywheel engaging position, second electrical switch means in an engine electric start circuit, the deadman control being actuable by an implement operator to a third position and including means for actuating said second switch means when said deadman control is in the third position for enabling the second switch means to start the engine, and second bias means connected to said deadman control for yieldably opposing the movement of said deadman control into said third position.

13. The safety device of claim 12 wherein said first spring bias means exerts a resistance force of a first level on the deadman control resisting movement of the deadman control toward said second position, and said second bias means exerts a resistance force of a second level significantly greater than the first level on the deadman control resisting movement of the deadman control into the third position.

14. The safety device of claim 13 wherein said second bias means is a spring bias means.

15. An internal combustion engine powered implement comprising:

an internal combustion engine having a crankshaft;

a deadman control normally biased toward a first position and actuable by an operator to a second position;

a flywheel coupled to and concentric with the engine crankshaft for rotation therewith, the flywheel being provided with a cylindrical friction surface generally coaxial with the axis of rotation of the flywheel;

a self-energizing braking member having a second friction surface normally biased into engagement with the flywheel first friction surface; and means coupled to the deadman control for positively retracting the second friction surface out of engagement with the first annular friction surface upon movement of the deadman control to the second position by the implement operator;

the cylindrical friction surface of the flywheel being an inner cylindrical surface of the flywheel and the braking member being so mounted that engagement between the member and flywheel inner surface acts to draw the member in a direction to apply an increased braking force against the flywheel, whereby, once engaged, the braking member becomes self-actuating until released.

16. The implement of claim 15 comprising an operator actuable engine starting mechanism actuated by operator movement of the deadman control beyond the second position.

17. The implement of claim 15 comprising electrical switch means coupled to said deadman control for disabling the engine ignition system when the deadman control is moved in a direction to allow the braking member to pivot toward the flywheel engaging position.

18. The implement of claim 17 wherein said electrical switch means is coupled to the deadman control through said braking member and is actuated by the movement of the braking member toward the flywheel engaging position.

* * * * *

UNITED STATES PATENT AND TRADEMARK OFFICE
CERTIFICATE OF CORRECTION

PATENT NO. : 4,757,885
DATED : July 19, 1988
INVENTOR(S) : Peter G. Kronich

It is certified that error appears in the above-identified patent and that said Letters Patent is hereby corrected as shown below:

Col. 4, line 46, change "flywheel 31" to --flywheel 13--;
Col. 5, line 41, change "cmbustion" to --combustion--;

Signed and Sealed this

Twentieth Day of December, 1988

Attest:

DONALD J. QUIGG

*Attesting Officer*  *Commissioner of Patents and Trademarks*